United States Patent [19]

Black et al.

[11] 3,980,755

[45] Sept. 14, 1976

[54] SYSTEM FOR REMOVING CHLOROMETHYL ETHER AND BIS-CHLOROMETHYL ETHER FROM AIR CONTAMINATED THEREWITH

[75] Inventors: Ronald F. Black, Philadelphia, Pa.; Clarence P. Kurtz, Cherry Hill, N.J.; Robert J. Pasek, Langhorne, Pa.

[73] Assignee: Rohm and Haas Company, Philadelphia, Pa.

[22] Filed: Dec. 24, 1975

[21] Appl. No.: 644,015

Related U.S. Application Data

[63] Continuation-in-part of Ser. No. 551,230, Feb. 19, 1975, abandoned.

[52] U.S. Cl................................. 423/240; 423/481; 260/606; 260/615 A; 260/632 B
[51] Int. Cl.².......................................... B01D 53/34
[58] Field of Search........... 423/240, 241, 245, 481, 423/488; 260/606, 615 A, 632 B; 55/71

[56] References Cited
UNITED STATES PATENTS

| | | | |
|---|---|---|---|
| 1,614,615 | 1/1927 | Jannek et al.......................... | 423/245 |
| 3,772,425 | 11/1973 | Kang et al........................... | 423/240 X |

OTHER PUBLICATIONS

Nichols et al., "Brief Communication: Relative Solvolytic Reactivities of Chloromethyl Ether & Bis(chloromethyl)ether," J. Nat. Cancer Inst., 50, 1373, (1973).

Tou et al., "Kinetic Study of the Stabilities of Chloromethyl Methyl Ether & Bis(chloromethyl) Ether in Humid Air," Anal. Chem., 46, No. 12, 1866, (1974).
Tou et al., "Kinetic Studies of Bis(chloromethyl) Ether Hydrolysis by Mass Spectrometry," J. Phys. Chem., 78, No. 11, 1096, (1974).

*Primary Examiner*—Earl C. Thomas

[57] ABSTRACT

Chloromethyl methyl ether and di(chloromethyl) ether contaminants are removed from air in laboratories, industrial plants and other locales wherein chloromethyl ether (more accurately called chloromethyl methyl ether) and bis-chloromethyl ether are used for various purposes. Silica gel and/or activated alumina are employed for removing the chloromethyl ethers either with or without other contaminants from the gaseous atmosphere wherein they occur. The absorption of the ethers on the silica gel or activated alumina is carried out under conditions of temperature that have been found to result in the hydrolytic decomposition of these chloromethyl ethers, apparently by virtue of catalytic action occurring on the surface of the silica gel or activated alumina. The decomposition of these ethers on contact with the silica gel or activated alumina results in the production of hydrogen chloride, as well as methylal, methanol, formaldehyde or mixtures thereof depending on the particular ether (CME, BCME or both) present in the contaminated stream.

10 Claims, No Drawings

SYSTEM FOR REMOVING CHLOROMETHYL ETHER AND BIS-CHLOROMETHYL ETHER FROM AIR CONTAMINATED THEREWITH

DESCRIPTION OF THE INVENTION

This application is a continuation-in-part of our co-pending U.S. patent application, Ser. No. 551,230 filed Feb. 19, 1975 and now abandoned.

In accordance with the present invention, an industrial plant or laboratory atmosphere (of inert gases, such as ambient air, nitrogen, or various mixtures thereof, etc.) contaminated with various reactive materials including vapors of chloromethyl ether and bis-chloromethyl ether which ether reactants are hereinafter referred to as CME and BCME respectively is passed through a mass of silica gel or activated alumina in the form of particles, granules or a cellular mass at temperatures ambient (about 15° to 30°C) up to 150°C. or higher.

The adsorption of the contaminants including CME and/or BCME on the surface of the silica gel or activated alumina occurs and results in decomposition of these two contaminants into hydrogen chloride, methylal and/or methanol and formaldehyde.

Passage of contaminated air containing CME and/or BCME even at ambient temperature results in practical removal and destruction (i.e., at least 99%) of the reactant ethers when the atmosphere being treated is relatively free of other organic contaminants and the proportion of the CME and/or BCME vapor is quite low, such as not over several hundred parts per billion. Such ambient temperature treatment is effective for the removal whenever the concentration of other polar organic materials in the atmosphere to be treated is relatively low, such as in a laboratory hood exhaust.

Nevertheless, it is preferred to raise the temperature of the contaminated gas or air that is to be passed through the silica gel to a temperature of at least about 60° to 70° or 80°C. when there is involved a large volume of the contaminated gas or air more or less continually produced, as in the case of a chemical plant wherein a large amount of the chloromethyl ethers is employed for the making of ion exchange resins. In the latter situations there may also be considerable quantities of other volatile organic materials that would be adsorbed on the surface of the silica gel or activated alumina. In order to volatilize and prevent the accumulation of such adsorbed organic material on the surface of the particles or in their pores, elevation of the temperature of the gas being treated and/or the adsorbent mass is preferred for practical operation.

In order to provide operation at an elevated temperature, the body of the contaminated gas or air is preferably elevated to a suitable predetermined temperature in a preheater which may be provided with a steam jacket for transferring heat to the gas or air as it passes through that equipment on its way through a suitable conduit to the adsorber bed in which the adsorbent particles are supported in the form of a column or bed. In this system the adsorption and decomposition of the chloromethyl ethers is quite efficient so that the atmosphere to be subjected to the adsorption may be relatively concentrated in the content of the chloromethyl ethers or it may be diluted with uncontaminated air as it is directed to the preheater on the way to the catalytic adsorber.

As an example of operation, the air or inert gas atmosphere in the room or enclosed space of a chemical plant, wherein one or both of the chloromethyl ethers is or are present in the atmosphere because of the use of such material(s) in the making of ion exchange resins and the escape of such material(s) from the equipment used for the reaction, is withdrawn through a gas-tight conduit communicating with the enclosed space and leading to the entrance port of a preheating chamber which may be equipped with suitable heating means, such as a saturated or superheated steam jacket. This contaminated atmosphere may be mixed with additional atmosphere either contaminated or uncontaminated, with the chloromethyl ether(s) and the mixed atmosphere is passed through the preheater. The preheated atmosphere may be at a temperature of 70° – 110°C. or higher on discharge from the preheater and then passed through a gas-tight conduit to the column or bed of granular adsorbent in the adsorber. Preferably the preheated contaminated atmosphere is fed or led into the upper portion of the closed chamber containing the silica gel or activated alumina supported on one or more foraminous plates. The bottom of the adsorber is connected to, and communicates with, a gas-tight discharge conduit which is connected to the entrance of a scrubber. In this instance, since the chloromethyl ether(s) are decomposed into hydrogen chloride and other water-soluble products, the use of water as a scrubbing agent is quite adequate to remove the decomposed contaminants. Generally, the flow of the air discharged from the adsorber may be controlled by means of a fan and directed by the fan into the base of the scrubber supplied at the top with water so that there is a counter current action in the scrubber.

It is desirable that the fan be located in the conduit extending from the discharge of the adsorber column or bed to assure that negative pressure is placed upon the closed room or space from which the ether-contaminated air is withdrawn. Such negative pressure pulls the air from the contaminated space through the air preheater and the adsorber. The conduit in advance of the preheater may be provided with a valve to allow other air or gas to be sucked in to be mixed with the contaminated air as it proceeds to the preheater.

The use of silica gel and/or activated alumina as adsorbers and catalysts, particularly at elevated temperatures such as about 70°C. and higher assures rapid hydrolytic decomposition of the chloromethyl ether(s) to water soluble materials even at concentrations of the ether(s) at least as high as 10 ppm. Furthermore, by operating at elevated temperatures of the contaminated air, the bed or column of adsorbent is in effect self-regenerating in that contaminating organic material does not accumulate, or is extremely slow in accumulating, on the surface of the adsorbent and cause in effect a poisoning of the catalyst system. Occasionally, the temperature of the air may be raised to much higher temperature than normal to aid in vaporizing any accumulated organic matter on the adsorbent.

The conduit connecting the preheater with the space to be decontaminated (that between the air preheater and the adsorber, and that between the adsorber and the scrubber) may be provided with temperature, pressure, and flow indicators and such indicators may be located in a common monitoring station at which it is possible to detect improper operation at any particular stage of the system.

While the contaminated gas or air may pass in either direction, that is from bottom to top or from top to bottom of the adsorber bed or column, it is generally preferred that it flow from the top, wherein it is distributed by a suitable manifold over the adsorber bed or column, to the bottom. The downward flow eliminates any tendency for channeling and allows high velocity of the air through the bed or column without the risk of lifting the particles from the bed. In addition, a single foraminous support, e.g., perforated plate or screen, at the bottom of the bed or column is generally adequate.

The flow of the air through the system may range from 100 – 3000 cubic feet per minute (cfm). Control valves may be provided in the conduits or lines mentioned. For example, a control valve may be provided in the conduit for feeding uncontaminated air to the mixing position in advance of the preheater. This valve may be responsive to an increase in pressure above atmospheric in the conduit leading chloromethyl ether(s)-contaminated air on its way to the air preheater and in the event of such increase, closes the valve preventing the escape of contaminant air into the diluting stream. This valve maintains constant volumetric flow for efficient operation. Again a control valve may be connected to the steam line serving to heat the jacket of the preheater and may be responsive to the temperature in the discharge line from the adsorber bed so as to raise or lower the temperature of the air preheater when the temperature of air discharged from the adsorber bed decreases or increases respectively beyond a certain point.

The advantage of the present system is the fact that the silica gel and/or activated alumina not only act to adsorb the contaminating chloromethyl ethers including the bis-chloromethyl ether but also to decompose them to materials that are readily soluble in water and can be readily removed merely by the use of water in a scrubber. It appears that the moisture that is present in a small proportion, e.g., from about 0.1 to 10% by volume, in the ambient air that is being decontaminated in this system aids in the catalytic breakdown of the chloromethyl ether(s) on the surface of the adsorbent. In anhydrous systems, moisture vapor in the range specified, about 4% being a preferred practical proportion, may be introduced into the gas conduit either before it is preheated or as the preheated gas proceeds to the adsorber. For example, in either situation the moisture may be introduced by bleeding saturated or superheated steam into either of the lines (i.e., into the conduit before entry of the air into the preheater or into the conduit for the preheated air just before it enters the adsorber bed). In either case the steam used for this purpose may be supplied in such a manner as to raise the temperature level in the adsorber or the preheater.

The following specific examples relate to long term studies designed to measure the typical useful lifetime of silica gel and alumina adsorbents in a plant environment, and the efficiencies which may be expected. Testing was continued beyond the times shown in the examples.

EXAMPLE 1

A heated 6 inch silica gel column containing W. R. Grace Grade 40 silica gel was placed in continuous operation to adsorb bis-chloromethyl ether (BCME) from an air stream, using the techniques hereinbefore disclosed. The results are summarized in the following Table.

TABLE I

Silica Gel Adsorption of BCME

WR Grace Grade 40 Silica Gel  6 inch bed height
45 gram silica gel bed  ¾ inch bed diameter
8 liter/min. gas flow rate  92 ft./min. superficial gas velocity High Temperature Adsorption[1]
BCME Concentration (ppb)

| Time of Operation (from start-up) Days | Inlet | Outlet | % Reduction |
|---|---|---|---|
| 50 | 316 | 12 | 96 |
| 53 | 424 | 40 | 91 |
|    | 305 | <1 | 99.7 |
| 54 | 761 | 12 | 98.4 |
| 55 | 118 | <1 | 99.2 |
| 56 | 366 | 1.1 | 99.7 |
| 57 | 425 | 4 | 99.1 |
| 60 | 130 | 13 | 90 |
| 61 | 717 | 187 | 74 |
| 62 | 340 | 15 | 96 |
| 63 | 78 | 6 | 92 |
| 68 | 1324 | 44 | 97 |
| 69 | 1230 | 21 | 98.3 |
| 70 | 933 | 20 | 98 |
| 76 | 819 | 62 | 92 |
| 77 | 897 | 36 | 96 |
| 82 | 765 | 57 | 93 |
| 105 | 796 | 2 | 99.7 |
| 106 | 763 | 5 | 99.3 |
| 109 | 788 | 3 | 99.6 |
| 113 | 1385 | 3 | 99.8 |
| Avg. | 651 | 26 | 96 |

[1] Passing the gases through the steam jacketed silica gel bed produces outlet vapor temperatures of ca. 87°C.

EXAMPLE 2

A column similar to that used in Example 1 was equipped with an air preheater (rather than a steam jacket on the column itself) and tested for BCME adsorption. The results are summarized below in the table.

TABLE II

Silica Gel Adsorption of BCME with Air Preheater

WR Grace Grade 40 Silica Gel  6 inch bed height
45 gram silica gel bed  ¾ inch bed diameter
10 liter/min. gas flow rate  115 ft./min. superficial gas velocity High Temperature Adsorption[2]
BCME Concentration (ppb)

| Time of Operation (from start-up) Days | Inlet | Outlet | % Reduction |
|---|---|---|---|
| 12 | 142 | 8 | 94 |
| 15 | 158 | 33 | 79 |
|    | 220 | 8 | 96 |
| 16 | 294 | <1 | 99.7 |
| 17 | 226 | <1 | 99.6 |
|    | 331 | <1 | 99.7 |
| 18 | 191 | <1 | 99.5 |
| 19 | 311 | 18 | 94 |
|    | 145 | 47 | 68 |
| 22 | 73 | 7 | 90 |
| 24 | 156 | 17 | 89 |
| 25 | 2555 | 34 | 98.7 |
| Avg. | 400 | 15 | 96 |

[2] Passing the gases through a preheater raised the temperature of the outlet vapors leaving the insulated gel bed to ca. 52°C.

EXAMPLE 3

Adsorption of BCME on silica gel was conducted in accordance with Example 2, but using a longer column of adsorbent. The results are summarized below in the Table.

TABLE III

High Temperature Adsorption/Increased Bed Height[3]

W R Grace grade 40 silica gel — 11 inch bed height
85 gram silica gel bed — ¾ inch bed diameter
8 liter/min. gas flow rate — 92 ft./min. superficial gas velocity BCME Concentration (ppb)

| Time of Operation (from start-up) Days | Inlet | Outlet | % Reduction |
|---|---|---|---|
| 1 | 1721 | <1 | 99.9 |
| 2 | 473 | <1 | 99.8 |
| 3 | 1020 | 2 | 99.8 |
| 8 | 100 | 6 | 94 |
| 11 | 488 | 1.0 | 99.8 |
| 14 | 194 | 2 | 99.0 |
| 38 | 1030 | 3 | 99.7 |
| 39 | 805 | 2 | 99.8 |
| 42 | 709 | 6 | 99.3 |
| 46 | 1506 | 11 | 99.3 |
| Avg. | 805 | 3 | 99.6 |

[3]Outlet vapor temperature ca. 45°C. Five inches new silica gel added to original 6" bed to increase total bed height to 11".

Comparing the results of Example 3 with Examples 1 and 2, it may be seen that average outlet concentrations of BCME are dependent on the adsorbent column height since the data of Table III obtained from an 11 inch bed of adsorbent show significantly lower outlet concentrations of BCME than the data of Tables I and II obtained from beds having only 6 inches of adsorbent. Outlet concentrations of 1 ppb BCME and less are shown to be possible by the method of the invention (see particularly Table III).

EXAMPLE 4

Adsorption of BCME on activated alumina was conducted in a six inch column. High removal efficiencies and low pressure drop were observed, the latter due to the relatively large spherical shape of the alumina.** The results are summarized below in the Table.

TABLE IV

Alumina Adsorption of BCME

Alcoa Grade H-151⅛" Activated Alumina
50 gram activated alumina bed
8 liter/min gas flow rate
6 inch bed height
¾ inch bed diameter
92 ft./min. superficial gas velocity
High Temperature Adsorption[4]

BCME Concentration (ppb)

| Time of Operation (from start-up) Days | Inlet | Outlet | % Reduction |
|---|---|---|---|
| 1 | 1470 | 15 | 99.0 |
| 2 | 1290 | 8 | 99.4 |
| 3 | 1868 | 12 | 99.4 |
| 7 | 1463 | 51 | 97 |
| 9 | 912 | 23 | 97 |
| 10 | 405 | 21 | 95 |
| 11 | 798 | 2 | 99.7 |
| 14 | 431 | 17 | 96 |
| 15 | 757 | 6 | 99.2 |
| 39 | 809 | 9 | 98.9 |
| 42 | 475 | 27 | 94 |
| 46 | 1968 | 16 | 99.2 |
| Avg. | 1054 | 17 | 98.4 |

[4]Outlet vapor temp. ca. 87°C.
**An activated alumina column containing 3-5 mm alumina spheres has shown only a ½ inch H₂O pressure drop across a 6 inch adsorption bed.

High efficiencies may be achieved for BCME adsorption with mixed beds of silica gel supported on particles of activated alumina (¼ inch diameter alumina) when run in accordance with the preceding examples.

It is to be understood that changes and variations may be made without departing from the spirit and scope of the invention as defined in the appended claims.

We claim:

1. A method of removing chloromethyl methyl ether and/or bis-chloromethyl ether from inert gasses, such as air, contaminated with small amounts of such ether which comprises contacting the contaminated gas containing a small amount by volume of water vapor with an adsorbent bed comprising silica gel or activated alumina, or mixtures thereof, at such a temperature that said ether component of the gas is hydrolized.

2. A method according to claim 1 wherein the temperature is in the range of up to about 150°C.

3. A method according to claim 1 wherein the temperature is in the range of about 60° to about 80°C.

4. A method according to claim 1 wherein the contaminated gas is preheated to a temperature sufficiently above 70°C. before it is passed into contact with the adsorbent bed to assure that the temperature of the effluent gas stream discharged from the adsorber is at least about 65°C.

5. A method according to claim 1 wherein the contaminated gas is passed through silica gel heated to a temperature sufficiently above 70°C. to assure that the temperature of the effluent gas stream discharged from the silica gel adsorber is at least about 65°C.

6. A method according to claim 1 wherein the contaminated gas is passed through activated alumina heated to a temperature sufficiently above 70°C. to assure that the temperature of the effluent gas stream discharged from the activated alumina adsorber is at least about 65°C.

7. A method according to claim 4 wherein the preheated contaminated gas is supplied to the upper region of the adsorber above the column or adsorbent bed and is discharged from the bottom thereof, the rate of flow of the gas and the temperature thereof being correlated with the volume of adsorbent in the adsorber to assure substantially complete break-down of said ether component into hydrogen chloride, methylal and/or methanol and formaldehyde.

8. A method according to claim 6 wherein the gas effluent from the adsorber is subjected to a scrubbing aqueous stream, e.g., by passing countercurrent to a stream of water in a scrubber.

9. A method according to claim 4 wherein the contaminated gas stream is periodically heated to a temperature level at least 50°C. above the range mentioned in claim 4 for short periods of time to reduce or eliminate any adsorbed organic matter accumulated on the adsorbent.

10. A method according to claim 5 wherein the silica gel is in particulate form having a mesh size in the range of about 6 to 20, U.S. wire screen scale and the moisture content of the air contaminated with said ether(s) is about 0.1 to 10% by volume of the air as it passes to the silica gel.

* * * * *